T. T. Fleming,

Cotton Scraper.

No. 68,296.    Patented Aug. 27, 1867.

Witnesses:
Theo Inseht
Wm. Truvn

Inventor:
T. T. Fleming
Per Munn & Co.
Attorneys.

United States Patent Office.

T. T. FLEMING, OF MEMPHIS, TENNESSEE.

Letters Patent No. 68,296, dated August 27, 1867.

---

IMPROVEMENT IN COTTON-SCRAPER.

---

*The Schedule referred to in these Letters Patent and making part of the same.*

---

TO ALL WHOM IT MAY CONCERN:

Be it known that I, T. T. FLEMING, of Memphis, Shelby county, Tennessee, have invented a new and improved Cotton-Scraper; and I do hereby declare that the following is a full, clear, and exact description thereof, which will enable others skilled in the art to make and use the same, reference being had to the accompanying drawings, forming part of this specification.

This invention relates to a new and improved implement for cultivating cotton, scraping the earth from the standing or growing plants; and it consists in constructing the scraper in such a manner that the blade or share is prevented from penetrating too deep into the earth, and also prevented from sliding laterally out of its proper course. In the accompanying sheet of drawings—

Figure 1:
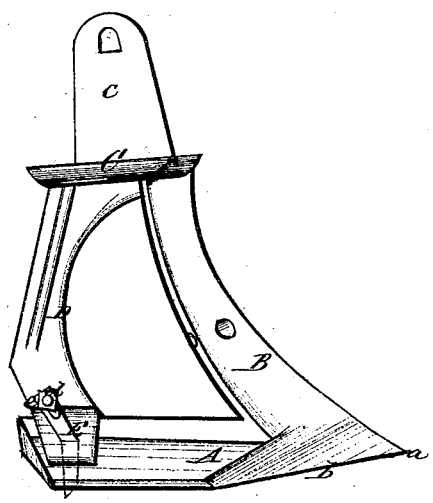

Figure 1 is a side view of my invention.

Figure 2:
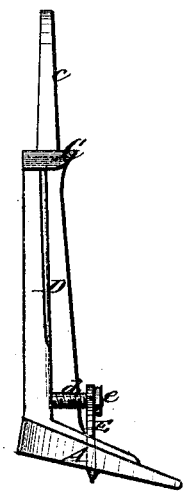

Figure 2 a rear view of the same.

Similar letters of reference indicate corresponding parts.

A represents the blade or share of the scraper, the front part of which is bevelled, so as to form a point, $a$, and an oblique cutting or penetrating edge, $b$, as shown in fig. 1. B is a curved standard which springs from the front part of the blade or share, and extends upward to a horizontal plate or shoulder, C, having a vertical shank, $c$, which passes through the beam of the implement, (not shown,) and is secured by a key, the beam resting on the plate or shoulder C. D is a bar or support which springs from the rear of the blade or share, and extends upward to the plate or shoulder C. Both the standard B and bar D extend up from the left-hand side of the blade or scraper, the latter projecting considerably to the right of the same, and being of taper or wedge form in its transverse section, as shown clearly in fig. 2. E represents a small knife which passes through an opening in the rear part of the blade or share, and has its upper end fitted on a pin, $d$, which projects horizontally from the bar or support D, the knife being secured on said pin by a screw-nut, $e$. This knife projects a trifle below the blade or share, and is designed to prevent the lateral slipping of the same, so that the earth may be scraped quite close to the plants without danger of cutting the same. In consequence of the blade or share having two supports, one at its front and the other at its rear, it may be readily controlled by the operator so as not to penetrate too deep into the earth, it being, of course, understood that the beam previously referred to is provided with one or more handles. The blade or share, standard, bar, plate or shoulder, and shank, may be of cast iron and all cast in one piece.

What I claim as new, and desire to secure by Letters Patent, is—

1. The combination of the blade or share A, standard B, bar D, and plate or shoulder C, all arranged substantially as and for the purpose set forth.

2. I further claim the knife E, applied to the rear of the blade or share, substantially as and for the purpose specified.

T. T. FLEMING.

Witnesses:
W. B. GLISSON,
JOHN HERRING.